United States Patent [19]
Elia

[11] Patent Number: 5,617,930
[45] Date of Patent: Apr. 8, 1997

[54] LADDER ASSEMBLY FOR A TAILGATE OF A TRUCK

[76] Inventor: Francis Elia, 140 Marshall Hill Rd., P.O. Box 334, West Milford, N.J. 07480

[21] Appl. No.: 417,989

[22] Filed: Apr. 6, 1995

[51] Int. Cl.$^6$ ..................................................... E06C 9/00
[52] U.S. Cl. ........................ 182/97; 182/166; 280/164.1; 296/62
[58] Field of Search ................................ 182/97, 95, 127, 182/163, 166; 280/163, 164.1, 166; 296/183, 57.1, 62

[56] References Cited

U.S. PATENT DOCUMENTS

| | | | |
|---|---|---|---|
| 2,678,831 | 5/1954 | Fisher | 280/166 X |
| 3,515,406 | 6/1970 | Endsley, Jr. | 280/166 |
| 3,545,567 | 12/1970 | Dohrman | 182/97 |
| 3,669,218 | 6/1972 | Hall | 182/97 |
| 4,021,071 | 5/1977 | Norman | 182/97 X |
| 4,139,078 | 2/1979 | Keller | 280/166 X |
| 4,161,997 | 7/1979 | Norman | 280/166 X |
| 4,191,388 | 3/1980 | Barksdale | 280/166 |
| 4,198,070 | 4/1980 | Weiler | 280/166 |
| 4,432,436 | 2/1984 | Suiter | 182/97 |
| 4,639,032 | 1/1987 | Barbour | 280/164.1 X |
| 4,757,876 | 7/1988 | Peacock | 182/95 |
| 4,846,487 | 7/1989 | Criley | 280/163 |
| 4,848,821 | 7/1989 | Llewellyn | 280/166 X |
| 4,909,352 | 3/1990 | McComb | 182/127 |
| 5,024,292 | 6/1991 | Gilbreath et al. | 280/163 X |
| 5,028,063 | 7/1991 | Andrews | 182/97 X |
| 5,039,119 | 8/1991 | Baughman | 182/127 X |
| 5,205,603 | 4/1993 | Burdette, Jr. | 296/62 |
| 5,236,062 | 8/1993 | Laney | 182/127 |
| 5,312,150 | 5/1994 | Quam | 296/62 |
| 5,335,752 | 8/1994 | Kozlowski | 280/166 X |
| 5,366,052 | 11/1994 | Keh-Lin | 182/127 X |

*Primary Examiner*—Terry Lee Melius
*Assistant Examiner*—Victor Batson
*Attorney, Agent, or Firm*—Alfred C. Hill

[57] ABSTRACT

An elongated arrangement is secured to an inner surface of a tailgate of a truck in a parallel relation with the rear of the truck, the elongated arrangement having a pair of first members dispose coextensive with the elongated arrangement, equally spaced from and parallel to the inner surface of the tailgate and spaced from each other to form a slot in the elongated arrangement coextensive therewith; a ladder arrangement having a first portion disposed in a rotatable and slidable relation with the slot adjacent one end thereof and a second portion pivotably and removably connected to the other end of the first portion having a plurality of steps to permit easy ingress and egress to and from a bed of the truck when the ladder arrangement is in its use position; and a tie down arrangement disposed in a removable relation with the slot and at least two of the steps to hold the ladder arrangement when rotated from the use position to a storage position disposed adjacent the elongated arrangement and the inner surface of the tailgate when the ladder arrangement is not in use.

20 Claims, 3 Drawing Sheets

LADDER ASSEMBLY FOR A TAILGATE OF A TRUCK

BACKGROUND OF THE INVENTION

The present invention relates to improvements in road vehicles and more particularly to a ladder assembly for specific use with the tailgate of trucks and the like.

Pick-up trucks were originally designed for use as utility vehicles, in which workmen used the bed of the vehicle for various industrial and agricultural functions. Customarily workmen did not require an intermediate step or ladder associated with the tailgate of the truck to permit ingress and egress into and from the bed of the truck, since the truck bed was not of a sufficient height to justify that additional apparatus.

However, with the advent of the use of caps, camper bodies and similar arrangements adapted specifically for the use with pick-up trucks, persons of small stature, for instance, women, children and elderly people, employing the pick-up trucks for vacation or recreational use, there is a requirement for easy access to the bed of the pick-up truck. Therefore, it has become desirable to provide an intermediate step or ladder to permit easy ingress and egress into and from the truck bed.

Several U.S. patents have been granted which are concerned with the same problem as mentioned above, namely, U.S. Pat. Nos. 4,161,997; 4,191,388; 4,639,032; 4,757,876; 4,846,487; 4,848,821; 5,028,063; 5,205,603; and 5,312,150. All of the above mentioned U.S. patents, and the patents referred to therein as prior art, have a fixed location for the ladder assembly when connected to the tailgate of a truck. Where the ladder assembly is stored on the truck tailgate, the storage normally takes place parallel to the longitudinal axis of the truck bed and not parallel to the transverse axis of the truck bed as in the present invention.

SUMMARY OF THE INVENTION

An object of the present invention is to provide an improved ladder assembly for a tailgate of a truck.

Another object of the present invention is to provide a ladder assembly for a tailgate of a truck which may be positioned for ingress and egress to the truck bed at any location along the tailgate.

Still another object of the present invention is the provision of a ladder assembly for a tailgate of a truck wherein the ladder assembly is stored in a parallel relationship with the transverse axis of the truck on the tailgate rather than parallel to the longitudinal axis of the truck as in the above-mentioned prior art.

A feature of the present invention is the provision of a ladder assembly for a tailgate of a truck comprising a elongated arrangement capable of being secured to an inner surface of the tailgate in a parallel relation with a rear of the truck, the elongated arrangement having a pair of first members disposed coextensive with the elongated arrangement, equally spaced from and parallel to the inner surface of the tailgate and spaced from each other to form a slot in the elongated arrangement coextensive therewith; a ladder arrangement having a first portion disposed in a rotatable and slidable relation with the slot adjacent one end thereof and a second portion pivotably and removably connected to the other end of the first portion having a plurality of steps to permit easy egress and ingress to and from the bed of the truck when the ladder arrangement is in its use position; and a tie down arrangement disposed in a removable relation with the slot and at least two of the steps to hold the ladder arrangement when rotated from the use position to a storage position disposed adjacent the elongated arrangement and the inner surface of the tailgate when the ladder arrangement is not in use.

BRIEF DESCRIPTION OF THE DRAWING

The above-mentioned and other features and objects of the present invention will become more apparent by reference to the following description taken in conjunction with the accompanying drawing, in which.

DESCRIPTION OF THE PREFERRED EMBODIMENT

Figure 1:
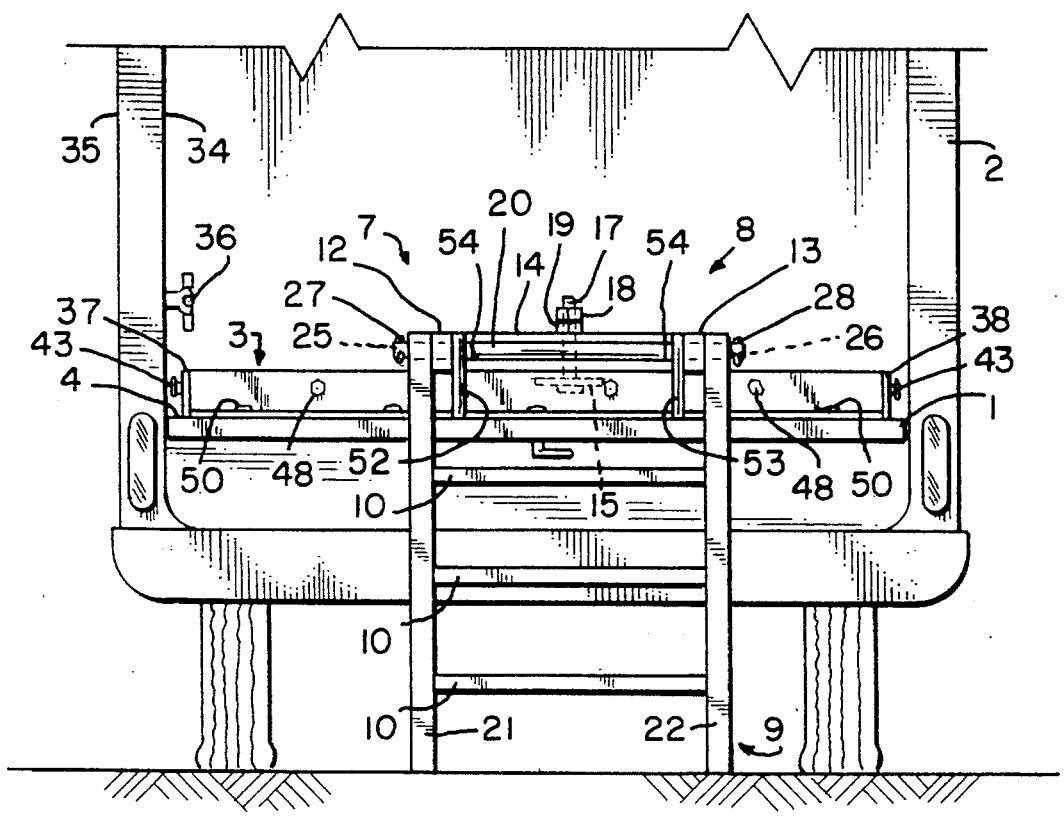
FIG. 1 is a view of the ladder assembly in accordance with the principles of the present invention looking at the rear of a truck.

Referring to FIGS. 1–8, there is illustrated therein a ladder assembly in accordance with the principles of the present invention for a tailgate 1 of a truck 2. The ladder assembly includes an elongated arrangement 3 secured to an inner surface 4 of tailgate 1 in a parallel relation with a rear of truck 2, that is, parallel to the transverse axis of truck 2. The elongated arrangement 3 includes a pair of first members 5 disposed coextensive with the elongated arrangement 3, equally spaced from and parallel to the inner surface 4 of tailgate 1 and spaced from each other to form a slot 6 in the elongated arrangement 3 coextensive therewith.

Figure 2:
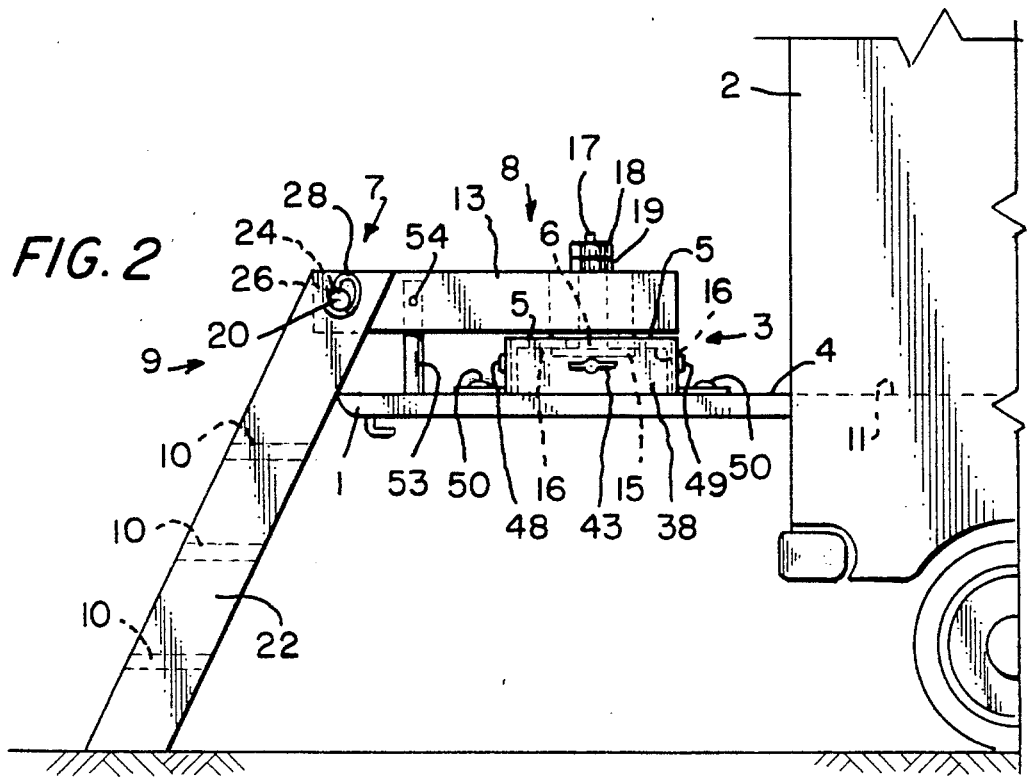
FIG. 2 is a side view of the ladder assembly of FIG. 1 in its use position.
Figure 3:
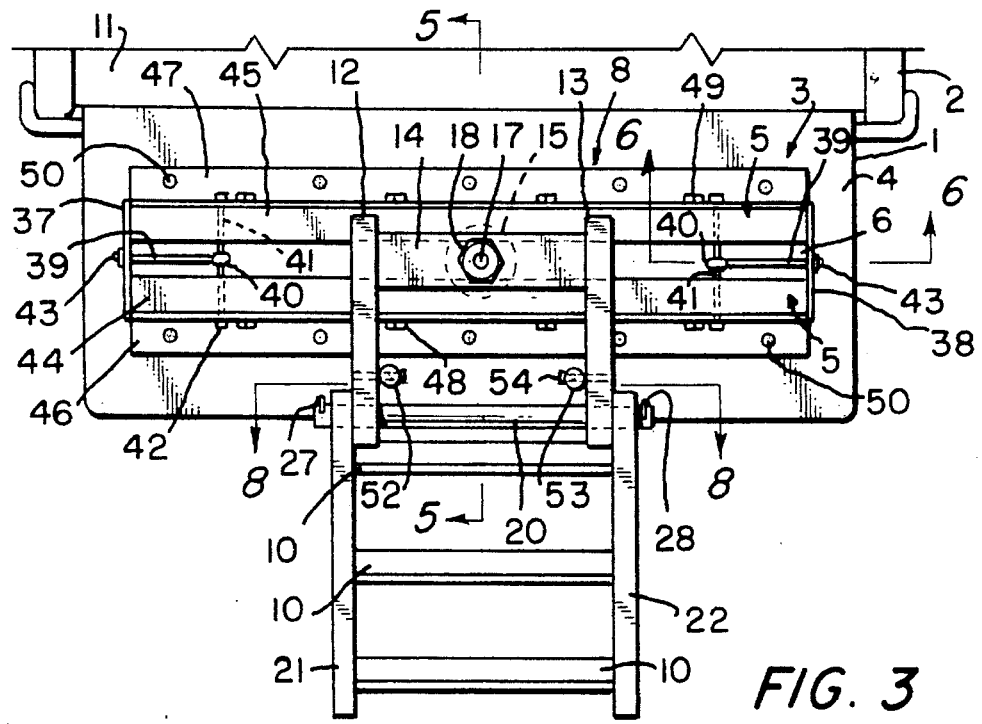
FIG. 3 is a top view of the ladder assembly of FIGS. 1 and 2 with the ladder arrangement in its use position in accordance with the principles of the present invention.

A ladder arrangement 7 includes a first portion 8 disposed in a rotatable and slidable relation with the slot 6 adjacent one end of first portion 8 and a second portion 9 pivotably and removably connected to the other end of first portion 8 having a plurality of steps 10 to permit easy ingress and egress to and from a bed 11 of truck 2 when the ladder arrangement 7 is in its use position shown in FIGS. 1, 2 and 3.

Figure 5:
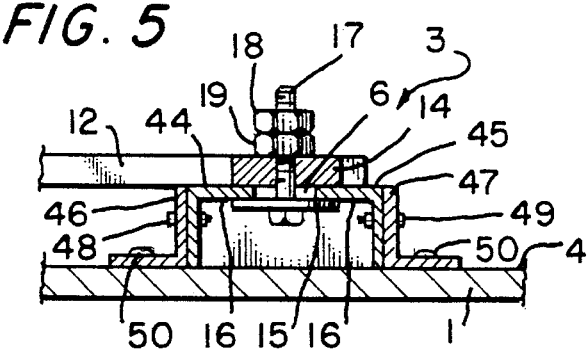
FIG. 5 is a cross-sectional view taken along line 5—5 of FIG. 3.

The first portion 8 includes a pair of second members 12 and 13 spaced from each other, a third member 14 disposed between and connected to each of the pair of second members 12 and 13. A washer-like component 15 slidably engages an under surface 16 of each of the pair of first members 5 to enable positioning the ladder arrangement 7 at any location along elongated arrangement 3. As best seen in FIG. 5, a bolt 17 engages the washer-like component 15 and extends through member 14 to enable rotating the ladder arrangement 7 to achieve a selected one of the use position of FIGS. 1, 2 and 3 and the storage position of FIG. 4. A pair of nuts 18 and 19 are threaded on bolt 17 so that when the ladder arrangement 7 is in either its use position, or in its storage position, the nuts 18 and 19 are interlocked one with the other to hold the ladder arrangement 7 in the selected one of the use position and the storage position. When the nuts 18 and 19 are loosened, it is then possible to rotate the ladder arrangement 7 to enable sliding the ladder arrangement 7 to a desired position along the elongated arrangement 3 and, hence, a desired position along tailgate 1. In addition, when loosening nuts 18 and 19, it is possible to rotate the ladder arrangement 7 into a selected one of the use position and the storage position at the selected location along the tailgate 1.

Figure 8:
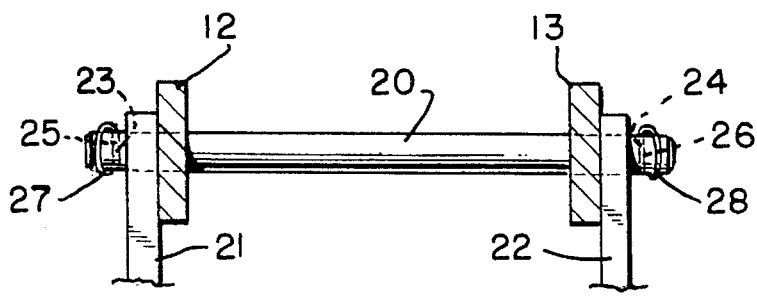
FIG. 8 is a cross-sectional view taken along line 8—8 of FIG. 3.

As mentioned hereinabove, the second portion 9 is pivotably connected to the first portion 8 of ladder arrangement 7. This is accomplished by providing a dowel 20 that extends through the pair of members 12 and 13 adjacent the other end thereof and an adjacent end of a pair of third members 21 and 22 of the second portion 9 to which the steps 10 are secured. Dowel 20 is secured in position by pins 23 and 24 inserted in apertures 25 and 26 at opposite ends of the dowel 20. As best seen in FIG. 8, a partial ring 27 and 28 are swivelly connected to the pins 23 and 24, respectively, so that when the rings 27 and 28 encircle the adjacent ends of dowel 20, the pins 23 and 24 are held in apertures 25 and 26. Removal of the pins 23 and 24 from the respective apertures 25 and 26 is accomplished by swivelling the partial rings 27 and 28 away from dowel 20 so that the pins 23 and 24, respectively, can be removed from their associated apertures 25 and 26. When either one of the pins 23 and 24 are removed from their associated aperture 25 and 26, the dowel 20 can be removed so that the portions 8 and 9 of ladder arrangement 7 can be separated or disconnected.

Figure 4:
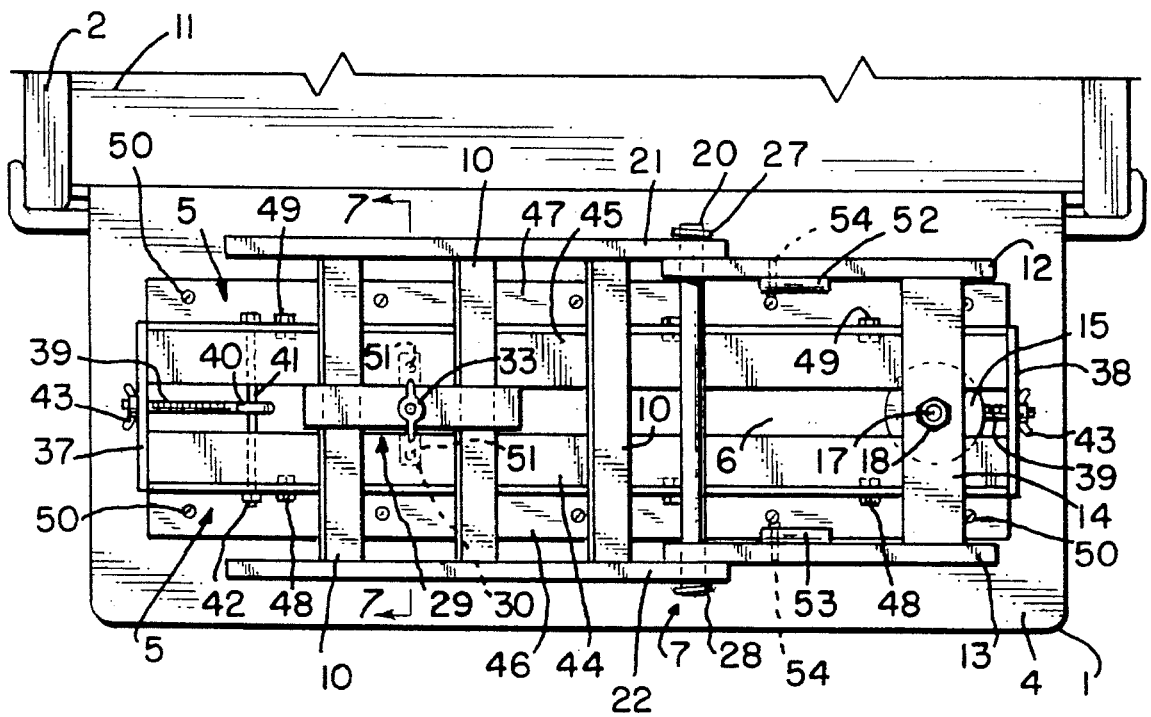
FIG. 4 is a top view of the ladder assembly in accordance with the principles of the present invention with the ladder arrangement in its storage position.
Figure 7:
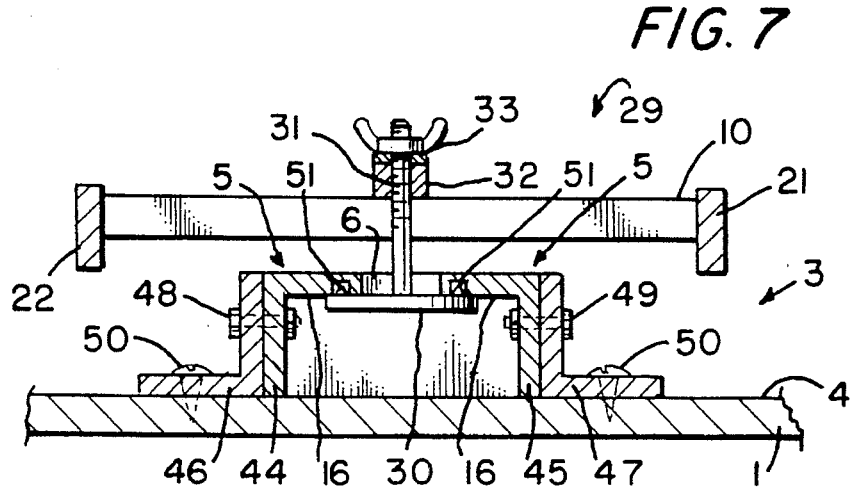
FIG. 7 is a cross-sectional view taken along line 7—7 of FIG. 4.

When the ladder arrangement 7 is rotated into the storage position illustrated in FIG. 4, the nuts 18 and 19 are tightened to hold the ladder arrangement 7 in its storage position and, in addition, a tie down arrangement 29 is provided as illustrated more clearly in FIG. 7. This tie down arrangement 29 includes a bar 30 removably engaging an inner surface 16 of the pair of first members 5. A bolt 31 is secured to bar 30 and extends through slot 6 and a member 32 which engages at least two of the steps 10 as seen in FIG. 4. A wing nut and washer combination 33 engage the bolt 31 to retain the bar 30 and the component 32 in position when the ladder arrangement 7 is in its storage position when the nut 33 is tightened. It is of course possible to remove the bar 30 and bolt 31 through the slot 6 and the component 33 from at least two of the steps 10 when the nut is loosened.

This tie down arrangement when the ladder arrangement 7 is in its use position can be stored on an inner surface 34 of a side 35 of truck 2 as illustrated in FIG. 1 at 36.

Figure 6:
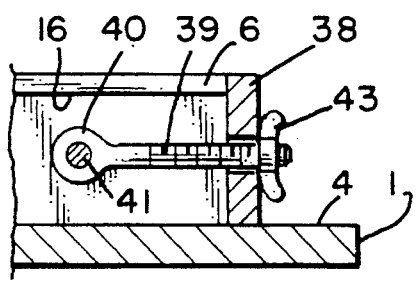
FIG. 6 is a cross-sectional view taken along line 6—6 of FIG. 3.

The slot 6 is open on both ends of the elongated arrangement 3. To ensure that the ladder arrangement 7 does not slip out of the slot 6, plates 37 and 38 as seen in FIGS. 3 and 4 are provided and are removably connected to the elongated arrangement 3 to provide this protection of undesired slippage of the ladder arrangement 7 from the elongated member 3. The plates 37 and 38 are held in position by a bolt 39 having an eye 40 through which a bolt 41 extends which is held in place by nut 42. The wing nut 43 is threaded onto bolt 39 to hold plates 37 and 38 in position to close the slot 6. If it should be desirable at any time to remove the ladder arrangement 7 from the slot 6, one of the plates 37 and 38 can be removed by removal of the wing nut 43 so that the washer-like member 15 can be slid along slot 6 and exit from the resulting open end of slot 6 when either of the plates 37 and 38 are removed. This is best illustrated in FIG. 6.

In a preferred embodiment, the first members 5 are provided by a pair of angle irons 44 and 45 as best seen in FIGS. 5 and 7. A second pair of angle irons 46 and 47 are provided which are bolted or otherwise secured thereto as shown by bolts 46 and 47. Angle irons 48 and 49 are then secured to the inner surface 4 of tailgate 1 by means of a sheet metal self-taping screw 50.

As mentioned above the angle irons 44, 46 and 45, 47 can be bolted together, as illustrated in the various figures. These angle irons can be spot welded, or line welded to form a composite unit, or a single sheet of metal can be bent to form the elongated arrangement 3 of the present invention.

In the tie down arrangement illustrated in FIG. 7, pins are provided in the bar 30, such as shown at 51, to engage associated holes in the undersurface of members 5 to prevent rotation of the bar 30 when tightening the wing nut 33.

There is also provided a pair of legs 52 and 53 which are rotatably secured to members 12 and 13 adjacent second portion 5 of the ladder arrangement 7 by the bolts 54 so that these legs 52 and 53 can be rotated to engage the inner surface 4 of the tailgate 1 to provide stability for the ladder arrangement 7 and remove the strain from the first portion 8 of the ladder arrangement 7 and in particular the washer-like member 15 and the members 5.

When the ladder arrangement 7 is placed into its storage position, as shown in FIG. 4, the legs 52 and 53 are rotated so that they do not interfere with the rotation of the ladder arrangement 7 into its storage position.

While I have described above the principles of my invention in connection with specific apparatus, it is to be clearly understood that this description is made only by way of example and not as a limitation to the scope of my invention as set forth in the objects thereof and in the accompanying claims.

I claim:

1. A ladder assembly for a tailgate of a truck comprising:

an elongated arrangement capable of being secured to an inner surface of said tailgate in a parallel relation with a rear of said truck, said elongated arrangement having a pair of first members disposed coextensive with said elongated arrangement equally spaced from and parallel to said inner surface of said tailgate and spaced from each other to form a slot in said elongated arrangement coextensive therewith;

a ladder arrangement having a first portion disposed in a rotatable and slidable relation with said slot adjacent one end thereof and a second portion pivotably and removably connected to the other end of said first portion having a plurality of steps to permit easy ingress and egress to and from a bed of said truck when said ladder arrangement is in its use position; and a tie down arrangement disposed in a removable relation with said slot and at least two of said steps to hold said ladder arrangement when rotated from said use position to a storage position adjacent said elongated arrangement and said inner surface of said tailgate when said ladder arrangement is not in use.

2. A ladder assembly according to claim 1, wherein said first portion includes a pair of second members spaced from each other, a third member disposed between and connected to each of said pair of second members, a first component slidably engaging an under surface of each of said pair of first members to enable positioning said ladder arrangement at any location along said elongated arrangement, and a second component engaging said first component and extending through said third member to enable rotating said ladder arrangement to achieve a selected one of said use position and said storage position.

3. A ladder assembly according to claim 2, wherein said first component includes a circular washer-like element; and said second component includes a first bolt extending through said washer-like element and said third member, and a pair of nuts interlocked one with the other to hold said ladder arrangement in said selected one of said use position and said storage position, said pair of nuts being loosened to enable rotating said ladder arrangement and to enable sliding said ladder arrangement to a desired location along said elongated arrangement.

4. A ladder assembly according to claim 3, wherein said tie down arrangement includes a bar removably engaging said under surface of each of said pair of first members, a third component removably engaging said at least two of said steps, a second bolt secured to said bar extending through said slot and said third component, and a nut and washer combination engaging said second bolt to retain said bar and said third component in position when said ladder arrangement is in said storage position when said nut is tightened and to enable removal of said bar and said second bolt through said slot and said third component from said at least two of said steps when said nut is loosened.

5. A ladder assembly according to claim 4, further including a storage arrangement adapted to located on an inner surface of a side of said truck to store said bar, said second bolt, said third component and said nut and washer combination when said ladder arrangement is in said use position.

6. A ladder assembly according to claim 5, wherein said second portion includes a pair of fourth members spaced from each other between which are disposed and secured said plurality of steps; and a dowel extends through said other end of said pair of second members and an adjacent end of said pair of third members to pivotably and removably connect said second portion to said first portion.

7. A ladder assembly according to claim 6, further including a pair of pins each inserted in a different one of a pair of apertures each disposed on opposite ends of said dowel to hold said dowel in position to pivotably connect said second portion to said first portion and to enable removing said dowel to disconnect said second portion from said first portion when at least one of said pair of pins is removed from its associated one of said apertures; and a fourth component swivelly connected to each of said pair of pins to encircle an adjacent end of said dowel to retain said pair of pins in their associated one of said pair of apertures and to enable removal of said at least one of said pair of pins from its associated one of said pair of apertures to disconnect said second portion from said first portion.

8. A ladder assembly according to claim 7, further including a leg rotatably connected to each of said pair of second members adjacent said other end thereof rotatable to engage said inner surface of said tailgate when said ladder arrangement is in said use position to reduce a strain on said first bolt and said pair of first members.

9. A ladder assembly according to claim 1, wherein said tie down arrangement includes a bar removably engaging an under surface of each of said pair of first members, a first component removably engaging said at least two of said steps, a bolt secured to said bar extending through said slot and said first component, and a nut and washer combination engaging said bolt to retain said bar and said first component in position when said nut is tightened and to enable removal of said bar and said bolt through said slot and said first component from said at least two of said steps when said nut is loosened.

10. A ladder assembly according to claim 9, further including a storage arrangement adapted to be located on an inner surface of a side of said truck to store said bar, said bolt, said first component and said nut and washer combination when said ladder arrangement is in said use position.

11. A ladder assembly according to claim 10, wherein a dowel extends through said other end of said first portion and an adjacent end of said second portion to pivotably and removably connect said second portion to said first portion.

12. A ladder assembly according to claim 11, further including a pair of pins each inserted in a different one of a pair of apertures each disposed on opposite ends of said dowel to hold said dowel in position to pivotably connect said second portion to said first portion and to enable removing said dowel to disconnect said second portion from said first portion when at least one of said pair of pins is removed from its associated one of said pair of apertures; and a fourth component swivelly connected to each of said pair of pins to encircle an adjacent end of said dowel to retain said pair of pins in their associated one of said pair of apertures and to enable removal of said at least one of said pair of pins from its associated one of said pair of apertures to disconnect said second portion from said first portion.

13. A ladder assembly according to claim 12, further including a means rotatably connected to said first portion adjacent said other end thereof rotatable to engage said inner surface of said tailgate when said ladder arrangement is in said use position to reduce a strain on said pair of first members and said first portion.

14. A ladder assembly according to claim 1, wherein a dowel extends through said other end of said first portion and an adjacent end of said second portion to pivotably and removably connect said second portion to said first portion.

15. A ladder assembly according to claim 14, further including a pair of pins each inserted in a different one of a pair of apertures each disposed on opposite ends of said dowel to hold said dowel in position to pivotably connect said second portion to said first portion and to enable removing said dowel to disconnect said second portion from said first portion when at least one of said pair of pins is removed from its associated one of said pair of apertures; and a fourth component swivelly connected to each of said pair of pins to encircle an adjacent end of said dowel to retain said pair of pins in their associated one of said pair of apertures and to enable removal of said at least one of said pair of pins from its associated one of said pair of apertures to disconnect said second portion from said first portion.

16. A ladder assembly according to claim 15, further including a means rotatably connected to said first portion adjacent said other end thereof rotatable to engage said inner surface of said tailgate when said ladder arrangement is in said use position to reduce a strain on said pair of first members and said first portion.

17. A ladder assembly according to claim 1, further including.

a means rotatably connected to said first portion adjacent said other end thereof rotatable to engage said inner surface of said tailgate when said ladder arrangement is in said use position to reduce a strain on said pair of first members and said first portion.

18. A ladder assembly according to claim 1, wherein said slot includes an open end on both ends of said elongated arrangement, and a pair of plates each removably connected to said elongated arrangement to close an associated one of said open ends of said slot, at least one of said pair of plates capable of being easily removed to enable disengaging said ladder arrangement from said slot.

19. A ladder assembly according to claim 1, wherein said elongated arrangement includes a first pair of angle irons each having a first portion extending upward from and perpendicular to said inner surface of said tailgate and a second portion disposed at a right angle to said first portion secured to said inner surface of said tailgate, and a second pair of angle irons each having a third portion disposed parallel to and secured to said first portion of each of said first pair of angle irons and a fourth portion disposed at a right angle to said third portion, said fourth portions providing said pair of first members.

20. A ladder assembly according to claim 19, wherein said slot includes an open end on both ends of said first and second pairs of angle irons, and a pair of plates each removably connected to said first portion and said third portion to close an associated one of said open ends of said slot, at least one of said pair of plates capable of being easily removed to enable disengaging said ladder arrangement from said fourth portions.

* * * * *